United States Patent [19]

St. Lawrence et al.

[11] 4,293,266

[45] Oct. 6, 1981

[54] ANTI-THEFT SECURITY ENCLOSURE AND RELEASING MECHANISM

[75] Inventors: David S. St. Lawrence, Dania; Robert Morris, Plantation; James G. Farrar, Coral Springs, all of Fla.

[73] Assignee: Sensormatic Electronics Corporation, Deerfield Beach, Fla.

[21] Appl. No.: 940,595

[22] Filed: Sep. 8, 1978

[51] Int. Cl.[3] .............................................. B65G 65/00

[52] U.S. Cl. .................................... 414/411; 206/387; 220/339; 220/352; 414/412

[58] Field of Search ........................ 414/412, 403, 411; 206/387, 1.5; 220/339, 352; 81/3.3; 29/806, 426.1; 250/481, 475; 312/319, 13, 15, 18, 19

[56] References Cited

U.S. PATENT DOCUMENTS

| | | | |
|---|---|---|---|
| 3,568,827 | 3/1971 | Haring | 206/1.5 |
| 3,871,516 | 3/1975 | Holkestad et al. | 206/387 X |
| 3,907,103 | 9/1975 | Shaw | 206/1.5 |
| 3,933,240 | 1/1976 | Humble | 414/403 |
| 4,011,940 | 3/1977 | Neal et al. | 206/1.5 |
| 4,093,103 | 6/1978 | Mumford | 206/1.5 |
| 4,163,499 | 8/1979 | Schmidt | 414/411 |

*Primary Examiner*—Trygve M. Blix
*Assistant Examiner*—L. E. Williams
*Attorney, Agent, or Firm*—Hopgood, Calimafde, Kalil, Blaustein & Judlowe

[57] ABSTRACT

A wraparound enclosure has two sections, joined by a hinged strap member, which telescopingly engage when applied around an article to form a right rectangular parallelepiped. A microwave detectable tag is secured on the interior to one wall of the enclosure. The sections are interlocked in the closed condition by three pairs of latches and strikes, two on each of three sides of the enclosure. Typically the enclosure may be installed around a container holding a cassette of magnetic recording tape. For authorized removal of the cassette and its container from a protected area such as a store, the enclosure is removed by insertion in a releasing mechanism having means for grasping one section while applying spring pressure against the enclosed container through an opening in the grasped section. A lever, upon being depressed, actuates a series of rocker plates with fingers to simultaneously engage and release all of the latches whereupon the enclosure springs open.

19 Claims, 17 Drawing Figures

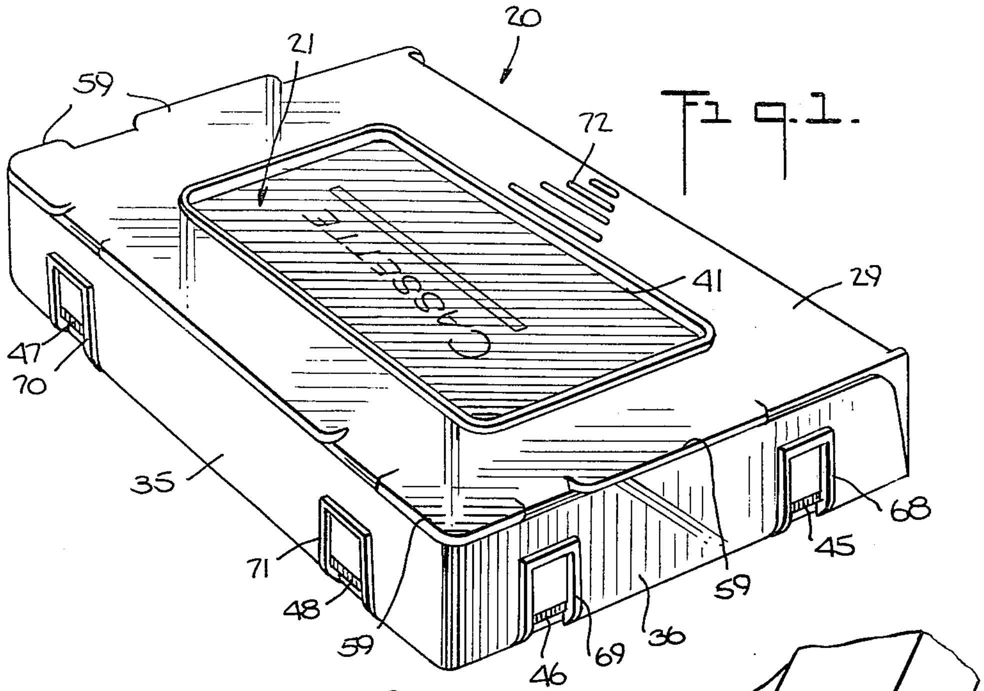
Fig. 1.
Fig. 2.
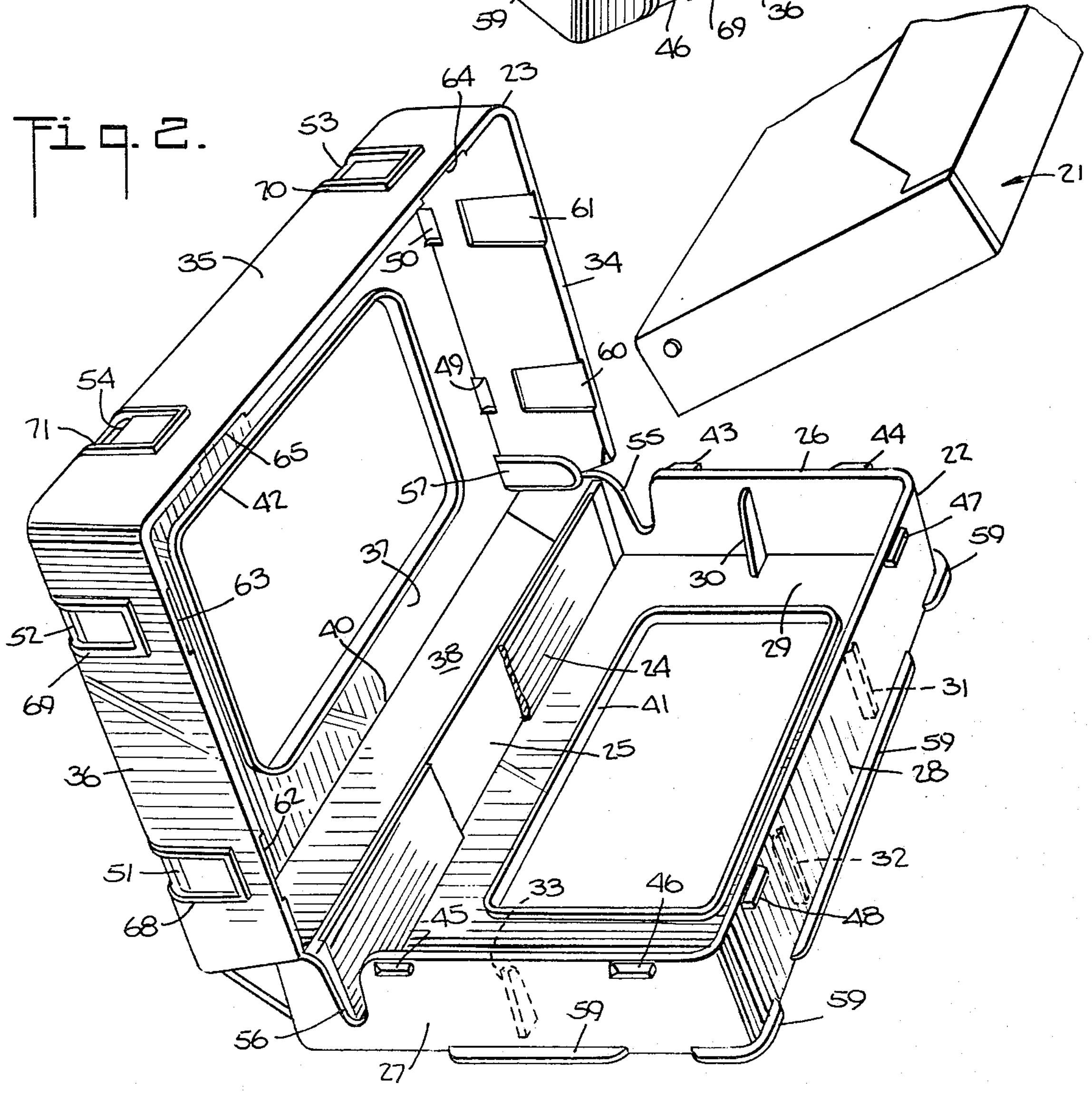

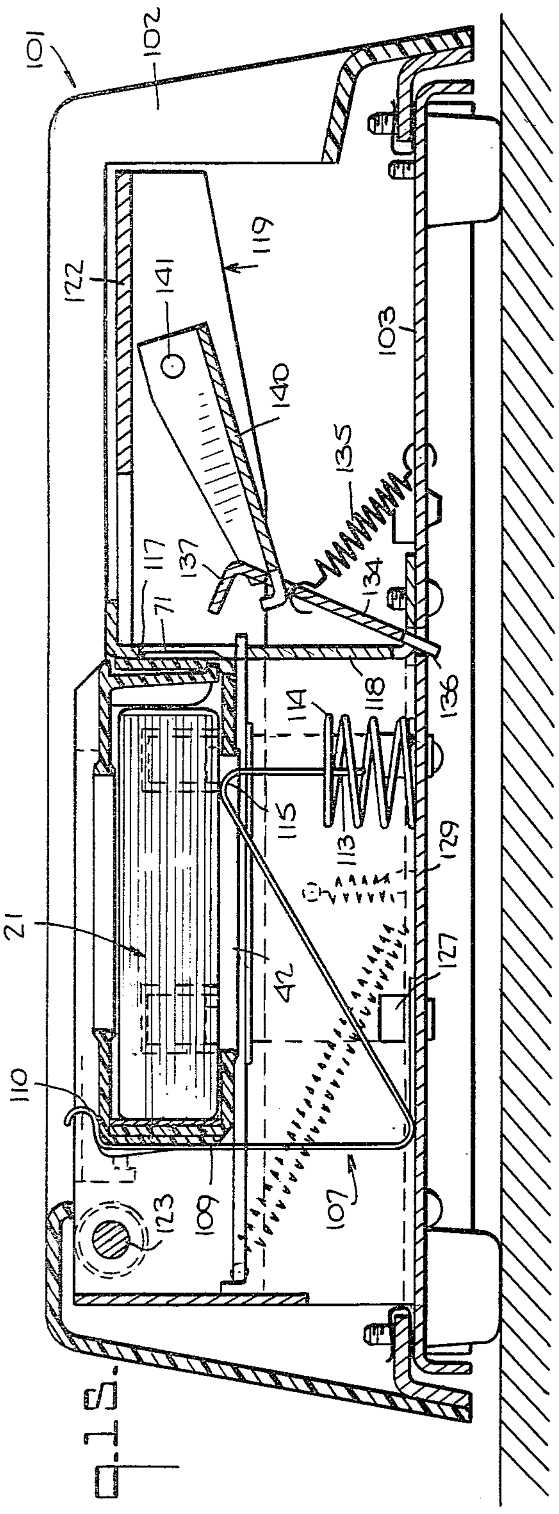
Fig. 15.
Fig. 16.
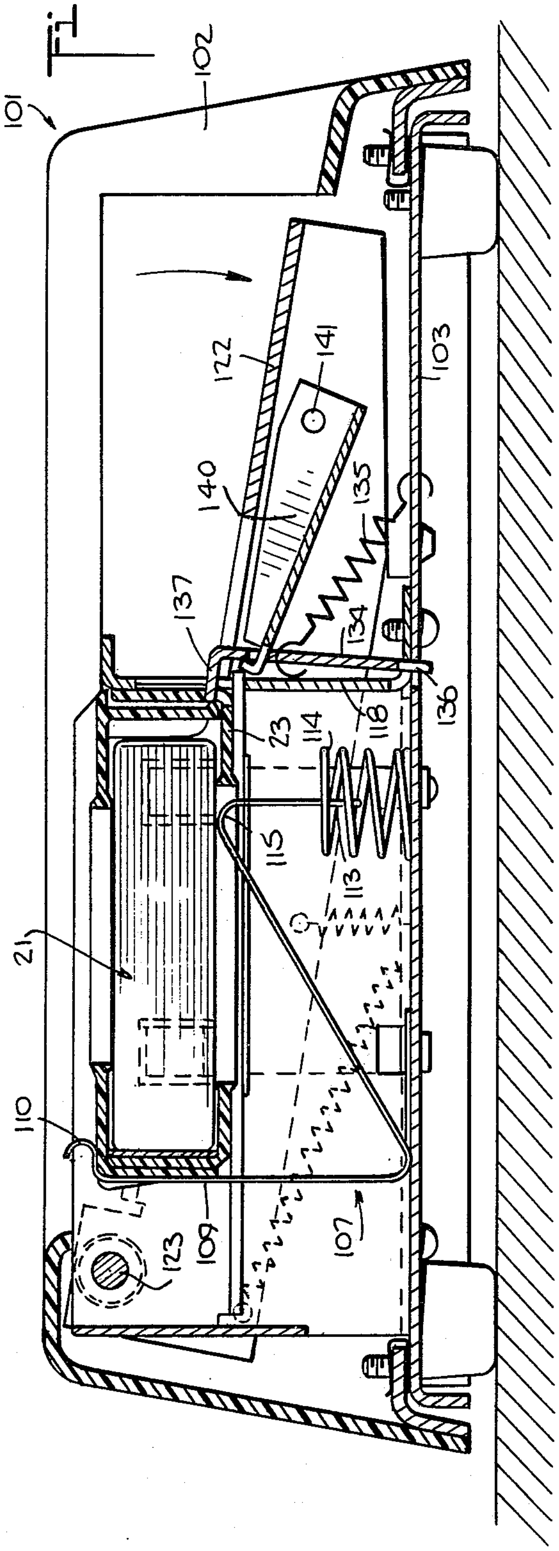

ANTI-THEFT SECURITY ENCLOSURE AND RELEASING MECHANISM

BACKGROUND OF THE INVENTION

The present invention relates to apparatus for preventing unauthorized removal of a small article from a protected area.

A well known and effective system for preventing shoplifting comprises a pair of scanners for setting up a microwave field at, for example, an exit of a store. Attached to merchandise to be protected are special tags which carry reradiating circuitry. When an item is properly purchased, the clerk removes the tag at the point of sale. If the tag is not removed and someone attempts to shoplift the tagged item, the reradiator energizes an alarm when it enters the microwave field, thereby alerting store personnel. For a more detailed discussion, reference can be had to U.S. Pat. No. 4,063,229 of John Welsh et al, issued Dec. 13, 1977 and assigned to the same assignee as the present invention.

The foregoing system has proven to be extremely successful in combatting shoplifting. However, certain types of merchandise cannot readily be associated with the necessary tags. Cassettes containing magnetic recording tape, for example, are particularly attractive to shoplifters and are difficult to tag. Furthermore, most stores would prefer to display such tape cassettes openly as an encouragement to impulse buying. Many other items present similar problems, such as, for example, small cameras, wristwatches, writing implements, lighters, etc.

In U.S. Pat. No. 3,933,240 of David R. Humble, issued Jan. 20, 1976 and assigned to the same assignee as the present invention, there is described apparatus for preventing the unauthorized removal of an article such as a tape cassette from a protected area comprising a container which has a main opening for receiving the article and at least two spaced key openings. The container carries an electromagnetic reradiator and includes article retaining means having a first position clear of the main opening and a second position blocking the opening. An article release device at the point of sale includes at least two spaced keys which are simultaneously advanceable into the key openings for shifting the retaining means from the second position to the first position. While the apparatus described in said Humble patent functions satisfactorily, the construction of the security container with its specialized locks and numerous parts is costly to manufacture and therefore not ideal for high volume usage as required by a retail outlet for audio tapes handling thousands of individual items.

Accordingly, it is a primary object of the present invention to provide a more economically fabricated container for small objects such as cassettes containing recording tape by means of which microwave security tags can be readily attached thereto. Other objects are to provide such protection while keeping the protected item in open view, and rendering the reradiating device difficult to remove by a shoplifter but easily removable by a checkout clerk.

SUMMARY OF THE INVENTION

In accordance with one aspect of the present invention, there is provided apparatus for preventing unauthorized removal of a small article from a protected area comprising in combination a device whose presence in said protected area is detectable by a surveillance unit, a wraparound enclosure having first and second interconnected sections for installation by wrapping about said article and for securing said device thereto, a plurality of independent latch means each including a latch and a mating strike for interlocking said sections in closed condition, said latch means being disposed on at least two different sides of said enclosure, and a releasing mechanism having means for simultaneously unlatching all of said latch means while grasping said second section and applying opening stress to said first section relative to said second section.

BRIEF DESCRIPTION OF THE DRAWINGS

The invention will be better understood after reading the following detailed description of the presently preferred embodiments thereof with reference to the appended drawings in which:

FIG. 1 is a perspective view of a wraparound enclosure installed about a cassette container in accordance with the invention;

FIG. 2 is a perspective view showing the enclosure in open condition prepared to receive a cassette in its container;

FIG. 15 is a view similar to FIG. 14 but showing the enclosure completely lodged within the releasing mechanism prior to actuation thereof;

FIG. 16 is a view similar to FIG. 15 but showing the releasing mechanism in its actuated condition; and FIG. 17 is a view similar to FIG. 16 illustrating the opening of the enclosure and extraction of the cassette in response to the actuation of the releasing mechanism.

Throughout the drawings the same reference numerals are used to designate the same or similar parts.

DESCRIPTION OF THE PREFERRED EMBODIMENT

Figure 3:
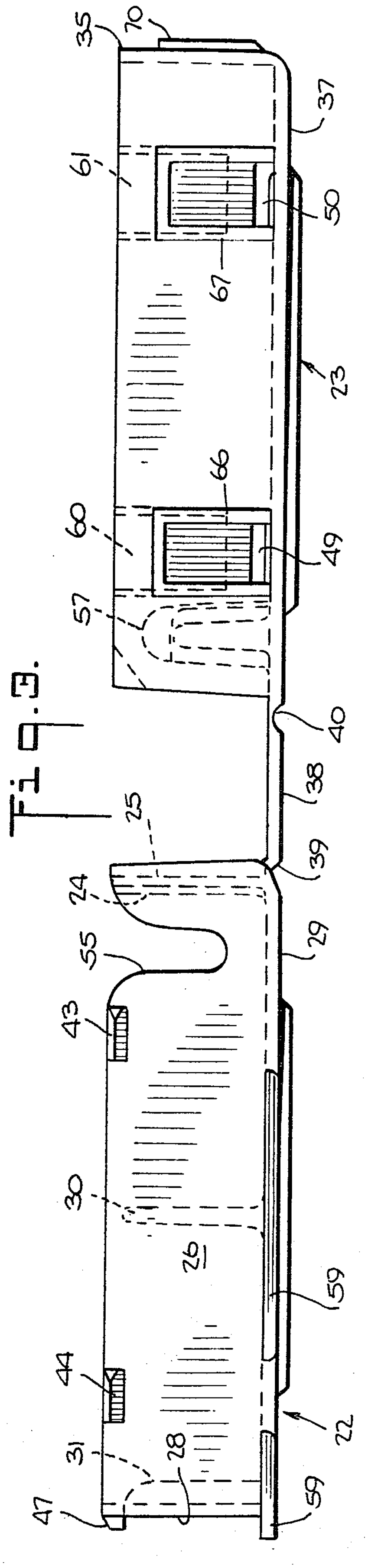
FIG. 3 is a side elevational view of the enclosure of FIG. 2 in fully open condition.
Figure 4:
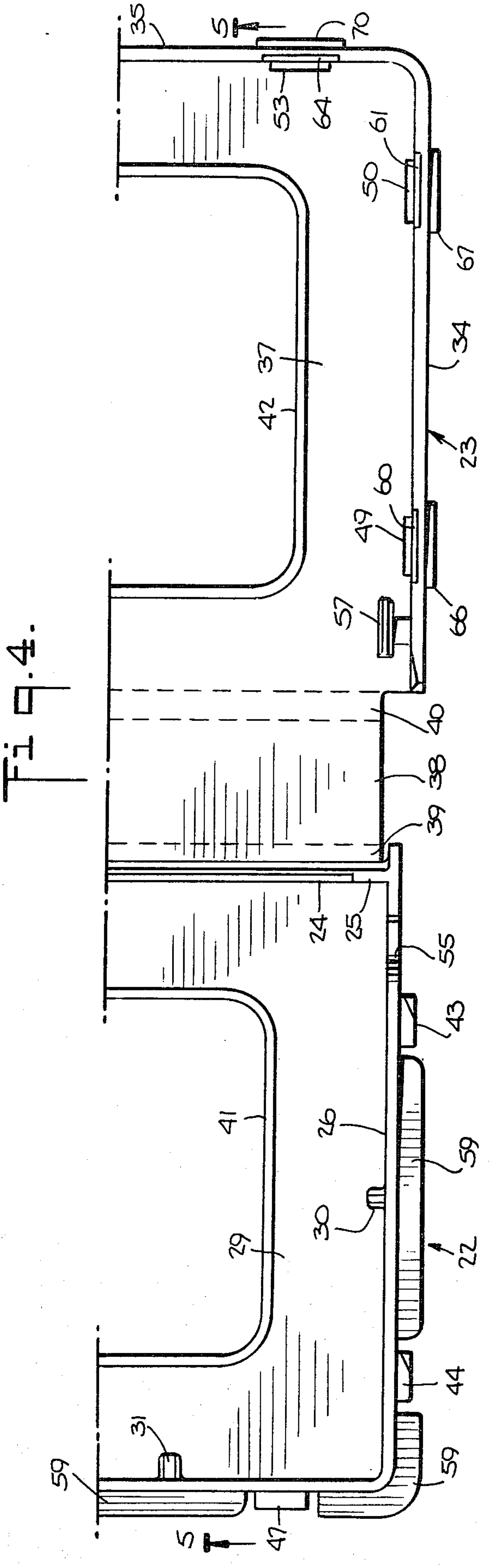
FIG. 4 is a fragmentary top plan view of the enclosure of FIG. 3.

Referring to FIGS. 1 to 9 of the drawings, the wraparound enclosure is designated generally by the reference numeral 20 while the container for a tape cassette is designated generally by the reference numeral 21. The container 21 forms no part of the present invention and will be recognized as a conventional package for a cassette containing magnetic tape.

The wraparound enclosure 20 of the present invention has a first section 22 interconnected with a second section 23 for installation about the container 21. A surveillance tag 24 containing electronic components detectable by a microwave surveillance unit is secured adhesively within a recess in the back wall 25 of the section 22. The wall 25 cooperates with side walls 26 and 27 at the right and left sides and a side wall 28 at the front, all of which extend normal to a primary wall 29, and with the primary wall 29, to form a receptacle or first section of an envelope for receiving the container 21. A plurality of vertical ribs 30, 31, 32 and 33 are located, buttress like, at the general locations seen in FIG. 2 both for centering the container 21 within the first section and for a purpose to be described below.

The second section 23 of the enclosure is similarly provided with side walls 34, 35 and 36 cooperating with a primary wall 37. However, although the first section 22 has side walls along all four side edges of its primary wall 29, the second section has side walls along only three of its four side edges, it having no side wall along the back edge of its primary wall 37.

As shown in the drawings, the enclosure, preferably formed from clear plastic material, has its first and second sections, 22 and 23, joined along a back edge by a strap member 38 joined to each of sections 22 and 23 by a living hinge 39 and 40, respectively.

The primary wall 29 of section 22 is provided with a central rectangular opening 41 while primary wall 37 of section 23 is provided with a similar rectangular opening 42. The openings 41 and 42 are provided both for the purpose of enhancing visual impact of the contents of the wraparound enclosure and facilitating interaction with the releasing mechanism in a manner to be described hereinafter.

The first section 22 of the envelope has its side walls provided with a plurality of latches 43 to 48 projecting therefrom, two from each of side walls 26, 27 and 28. The second section 23 has its side walls 34, 35 and 36 provided with the strikes 49 to 54 with which the respective latches 43 to 48 mate when the enclosure is placed in its closed condition wrapped around the container 21.

The side walls 26 and 27 of the first section 22, at the right and left sides thereof, near the back edge, are formed with respective notches 55 and 56 extending inwardly from the free edge of the side wall toward the associated primary wall 29. The mating side walls 34 and 36 of the second section 23 are provided with T-shape lugs 57 and 58, respectively, for interengagement with the corresponding notch 55 and 56, respectively, for a purpose to be described.

Figure 5:
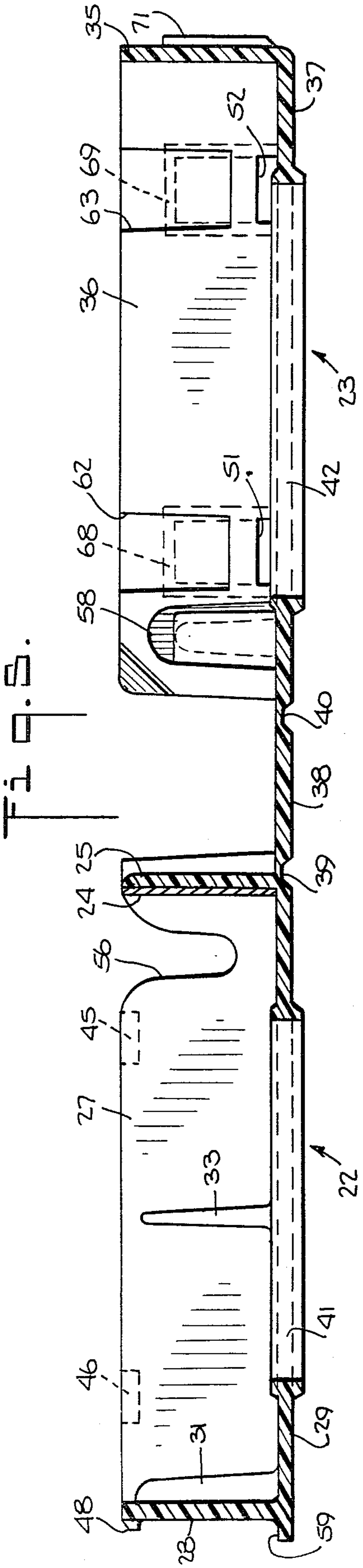
FIG. 5 is a sectional view of the enclosure taken along line 5—5 of FIG. 4.
Figure 7:
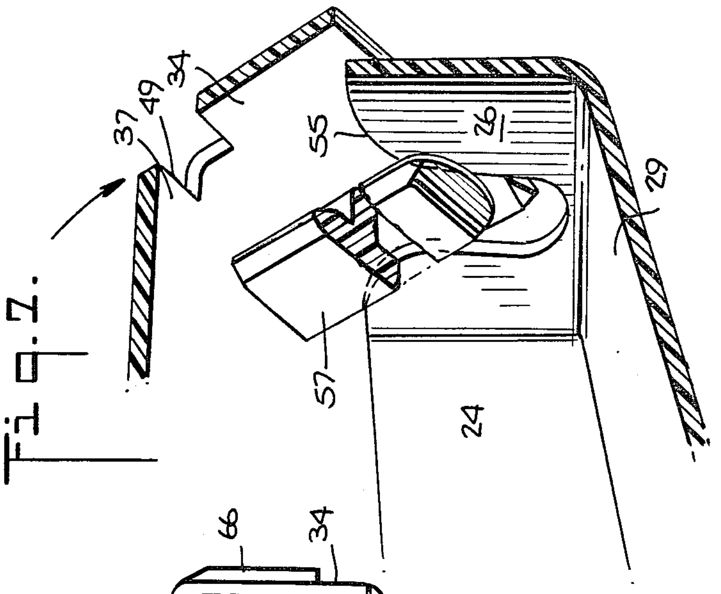
FIG. 7 is a fragmentary perspective view showing the interrelation of a detail of the enclosure during closing operation thereof.
Figure 9:
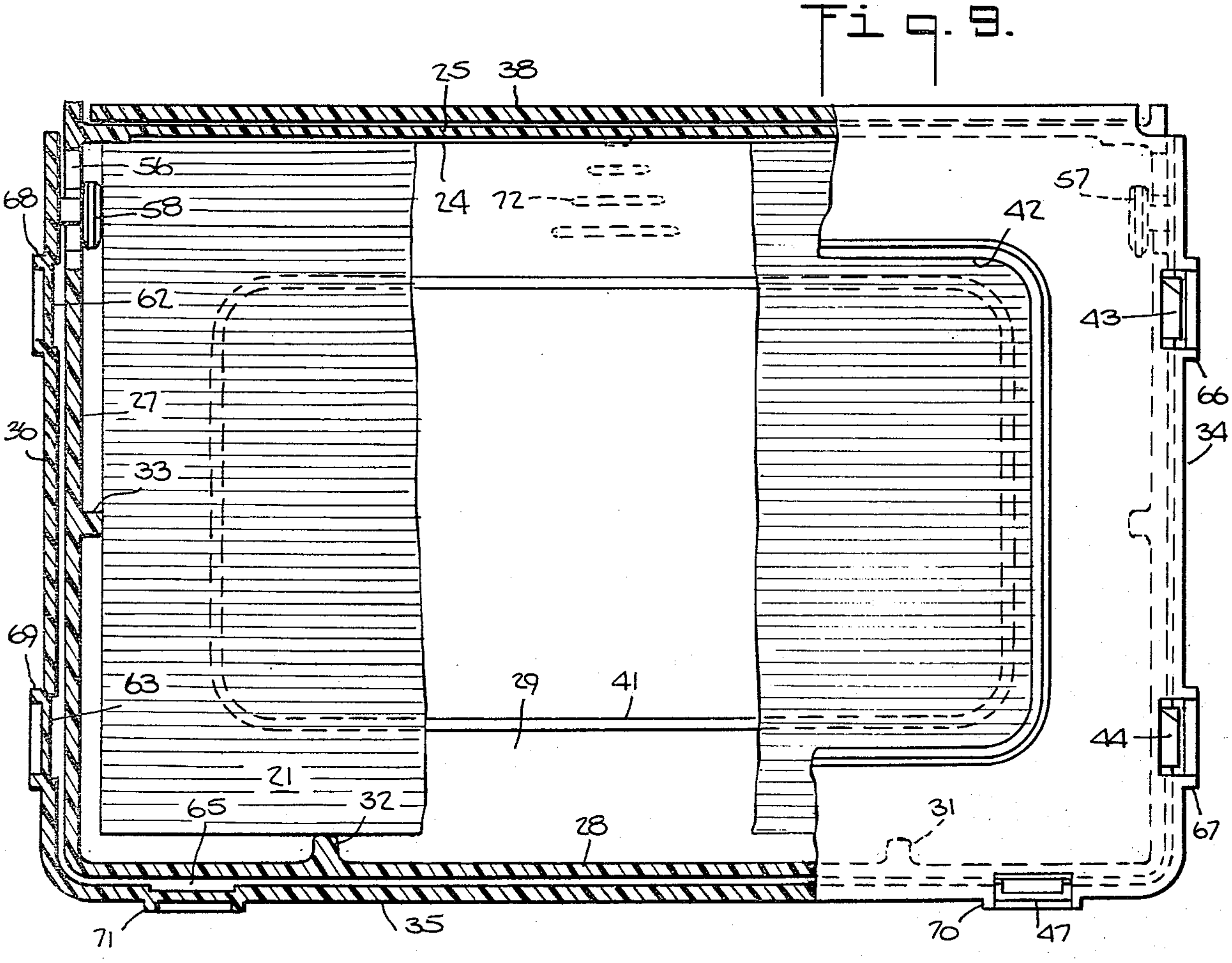
FIG. 9 is a plan view with portions broken away of the enclosure of FIG. 1 as viewed from the underside thereof.
Figure 11:
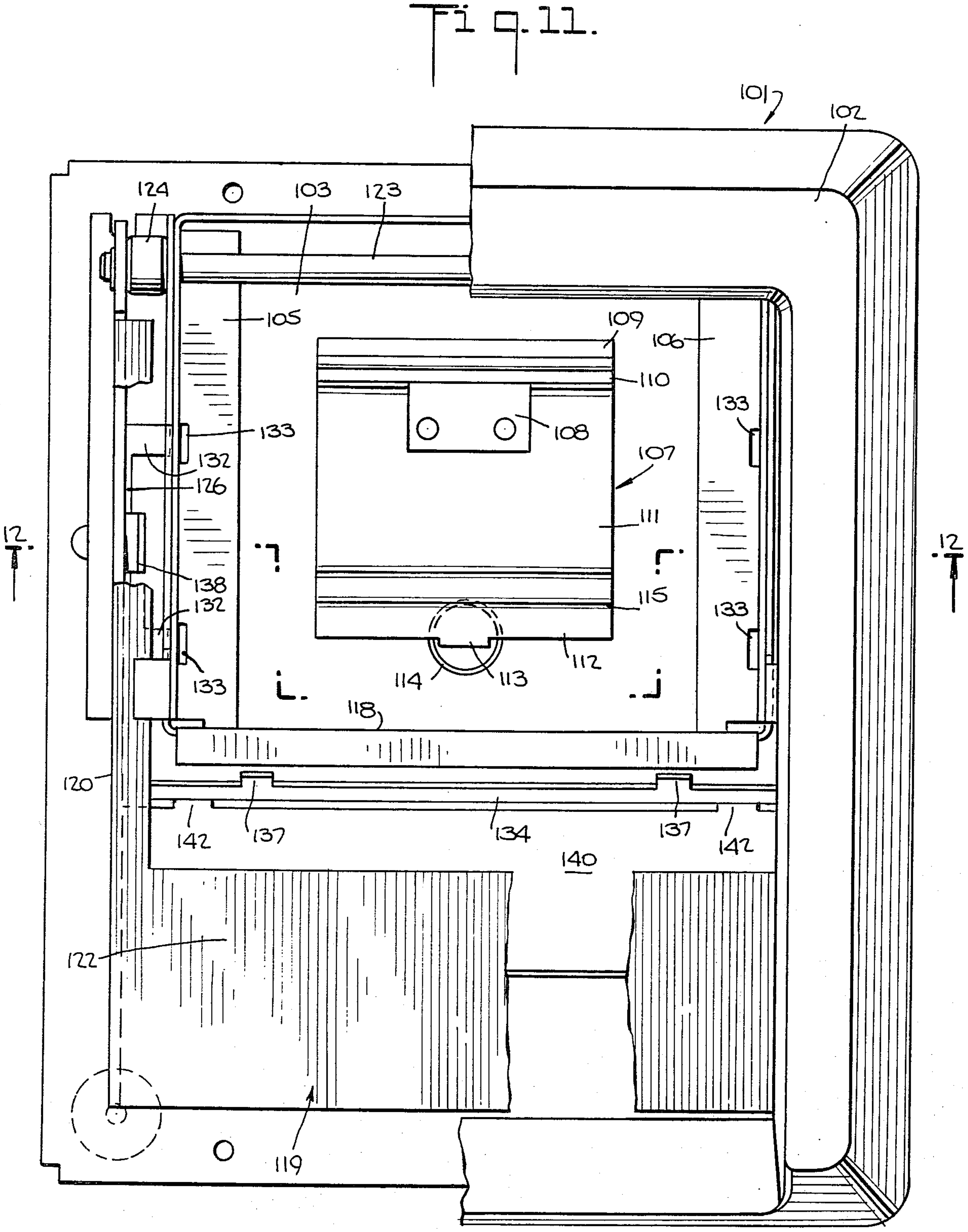
FIG. 11 is a top plan view with portions broken away of the releasing mechanism of FIG. 10.
Figure 12:
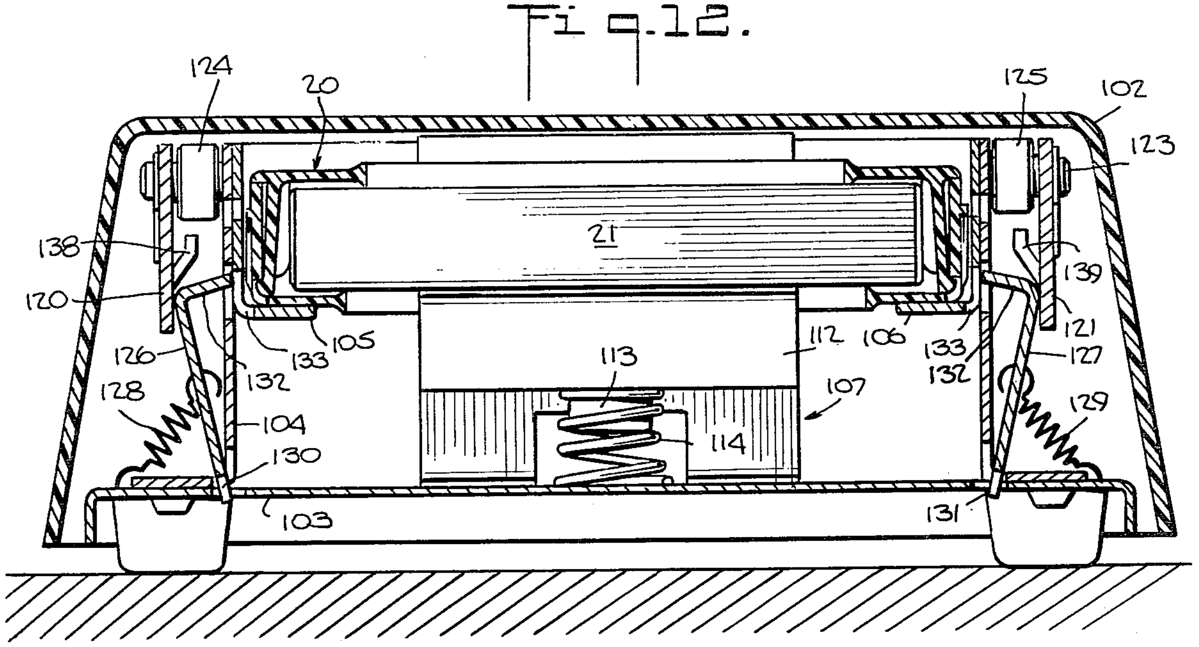
FIG. 12 is a transverse sectional view taken along line 12—12 in FIG. 11.

As best seen in FIGS. 5 and 9, the side wall 25 of section 22 adjacent the back edge thereof is located inward adjacent the living hinge 39 such that upon closure of the sections 22 and 23 the strap member 38 overlies the side wall 25 with a close fit.

The primary wall 29 of section 22 projects beyond its respective side walls along its right, left and front edges over a major portion of said edges presenting the flange portions designated by the numeral 59. When the enclosure is in closed condition the flanges 59 tend to bar access to the interface region between overlapping side walls of the first and second sections.

It may be observed that the ribs 30, 31, 32 and 33 are located at points along the respective side walls intermediate the locations of the latches on such side wall. Referring, for example, to latches 43 and 44 on side wall 26, if the latch 44, for example, were deflected inwardly toward the opposite side wall 27, the buttress support afforded by rib 30 will oppose communication of such inward displacement of the wall 26, that occurs adjacent latch 44, to the adjacent latch 43. In similar manner, ribs 31 and 32 isolate latch 47 from latch 48 while rib 33 isolates latch 45 from latch 46.

As best seen in FIG. 2, the inner surfaces of the side walls of section 23 are provided with grooves or channels 60 to 65 associated respectively with strikes 49 to 54. The grooves or channels 60 to 65 provide guideways and reliefs for facilitating entry of the corresponding latches 43 to 48 into engagement with the corresponding strike. As shown, the grooves stop short of the strike area.

On the external surface of the side walls the area around each strike is reinforced by a U-shape ribbed protuberance 66 to 71, respectively. Besides reinforcing the side wall the protuberances 70 and 71 perform an additional function with respect to the releasing mechanism that will be described hereinafter. In addition, the protuberances provide an additional guard resisting tampering by devices other than the special releasing mechanism for opening the enclosure.

Figure 8:
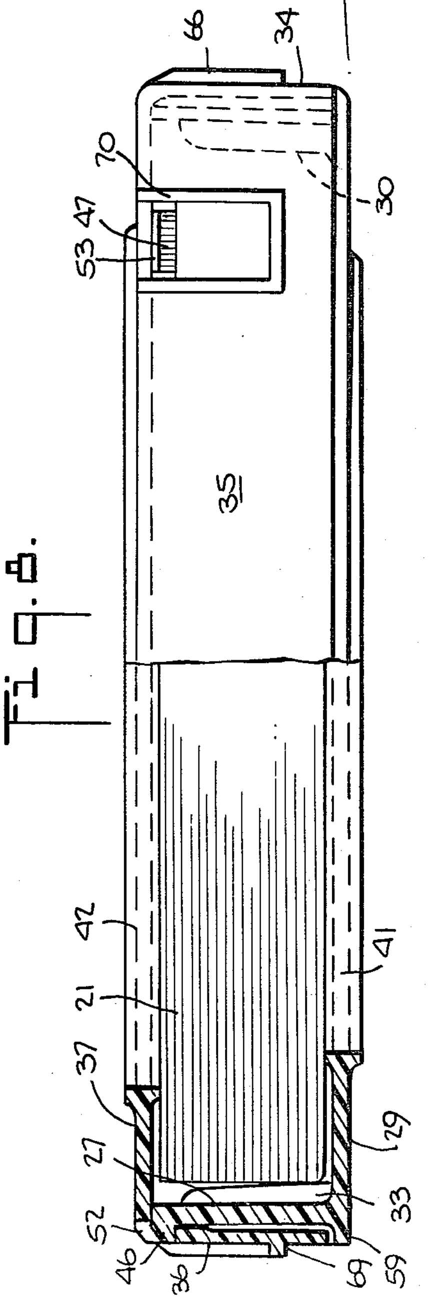
FIG. 8 is a front elevational view with a portion broken away of the enclosure of FIG. 1 showing the interrelation between the latch and strike elements making up the latch means.
Figure 6:
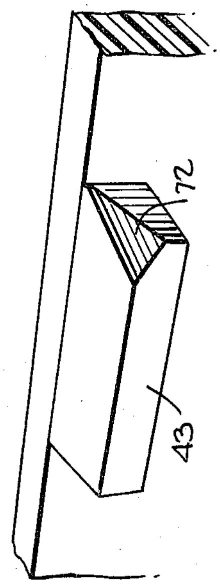
FIG. 6 is an enlarged fragmentary view of a latch employed in the enclosure of FIGS. 1 to 5.
Figure 10:
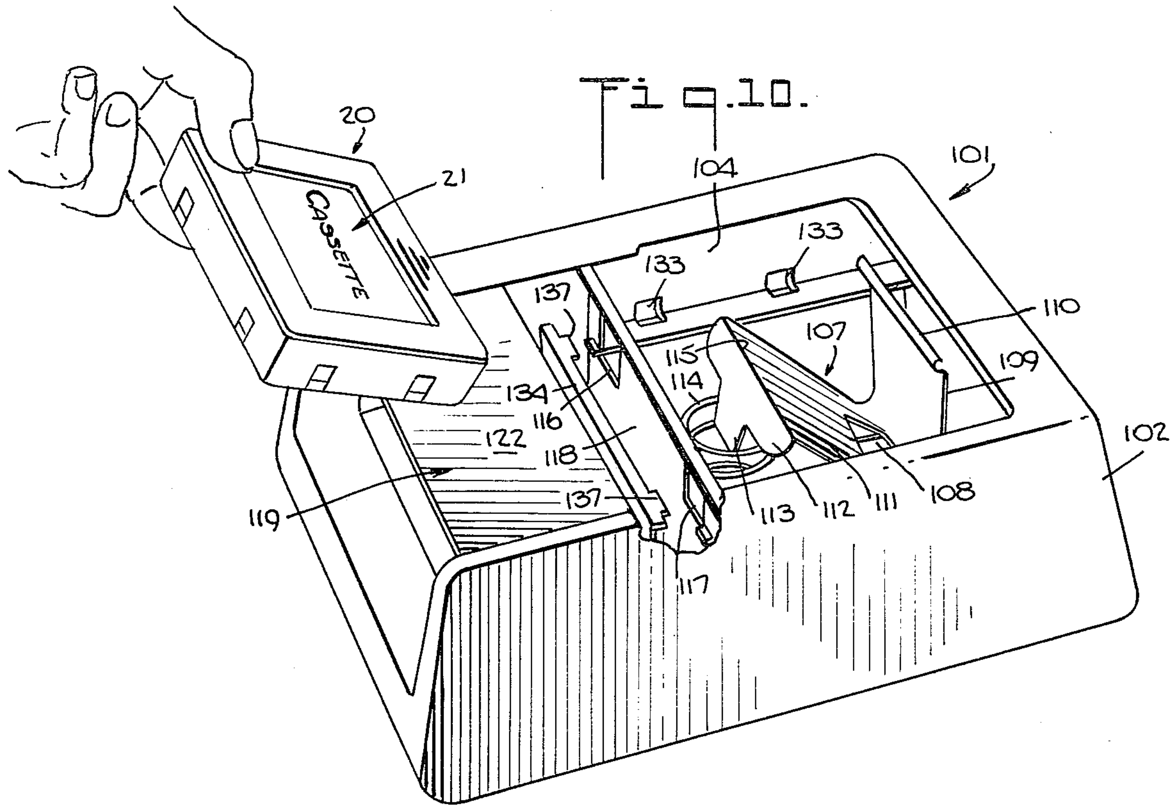
FIG. 10 is a perspective view of a releasing mechanism constructed in accordance with the invention about to receive a closed enclosure.

When a cassette in its container 21 is disposed within section 22 of the enclosure, the latter may be closed by folding one section over the other. The section 22 telescopes within section 23 while the T-shape lugs 57 and 58 enter the respective notches 55 and 56 in the manner illustrated in FIG. 7. A chamfer on each of the latches 43, 44, 45 and 44, as shown at 72 in FIG. 6, functions as a camming surface to facilitate the passage thereby of the side walls 34 and 36 of section 23. Upon bringing the two sections of the enclosure together, all of the latches 43 to 48 engage their respective strikes as best seen in FIG. 8.

As seen in FIG. 9, the T-shape lugs 57 and 59 cooperate with the mating notches 55 and 56 to prevent separation of the respective overlapping right and left side side walls 26 and 34 on the one hand and 27 and 36 on the other hand in a direction normal to such side walls; that is, the interengaging means prevents the side walls from being pried apart from the hinge end of the enclosure.

Referring now to FIGS. 10 to 17, there is shown therein the releasing mechanism for unlatching and opening the wraparound enclosure 20, the releasing mechanism being designated generally by the reference numeral 101. The releasing mechanism has a housing 102 fastened to a base plate 103 on which is mounted the various components for supporting the enclosure 20 and releasing the latches while applying opening force thereto. Support for the enclosure 20 is provided by a frame assembly 104 having horizontally disposed flanges 105 and 106 which engage the undersurface of the enclosure 20 when it is fully inserted. A Z-shape member 107 formed from spring sheet metal is fastened to the base plate 103 by an integral tab 108. The member 107 has a generally vertical rear portion 109 terminating in a curled lip 110, an inclined intermediate portion 111, and a forward dependent portion 112 terminating in a narrow tab 113 which is engaged by and centers a coiled compression spring 114 supported by the base plate 103.

Figure 14:
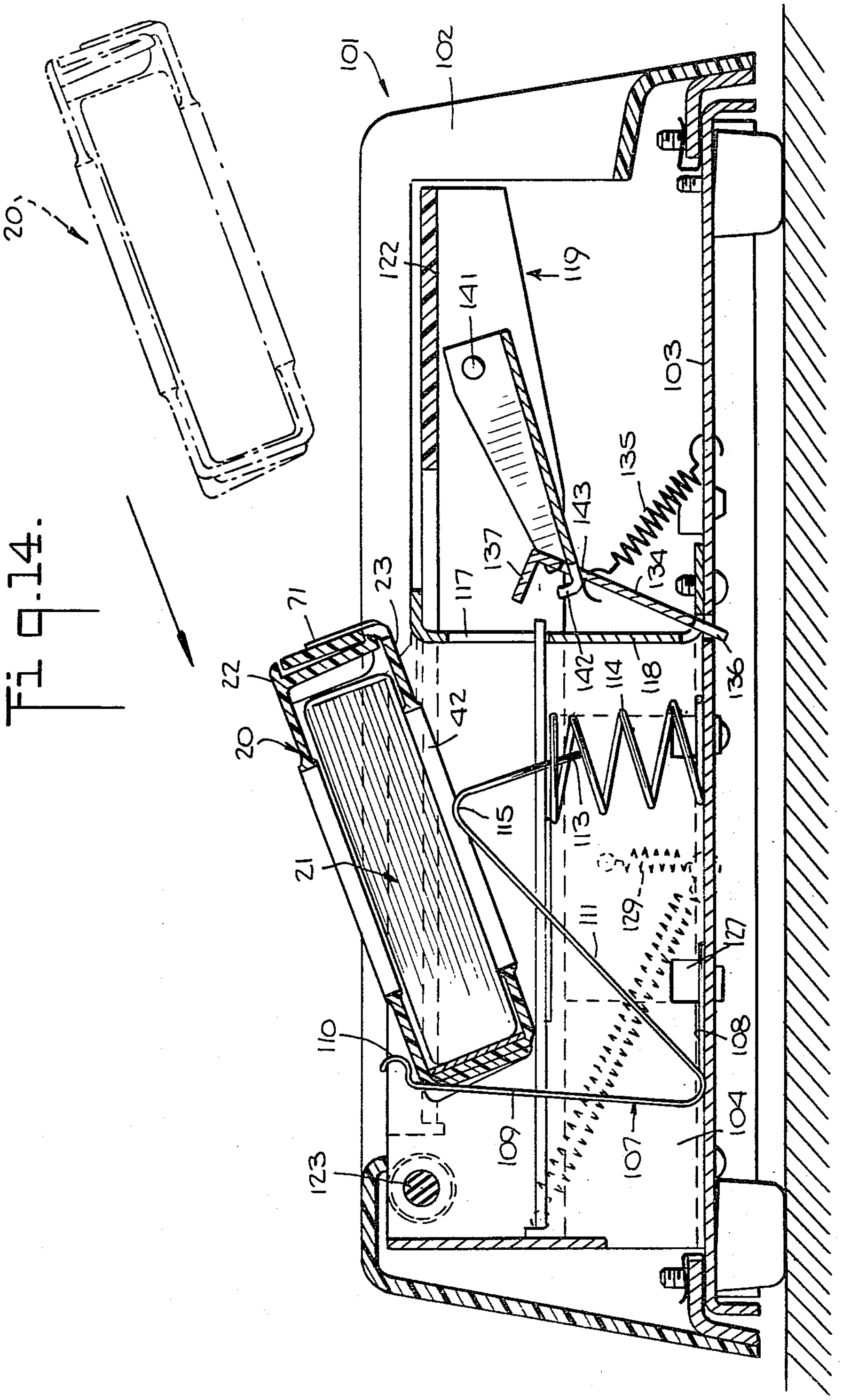
FIG. 14 is a longitudinal sectional view of the mechanism of FIG. 12 illustrating the introduction of a closed enclosure containing a cassette.
Figure 11:
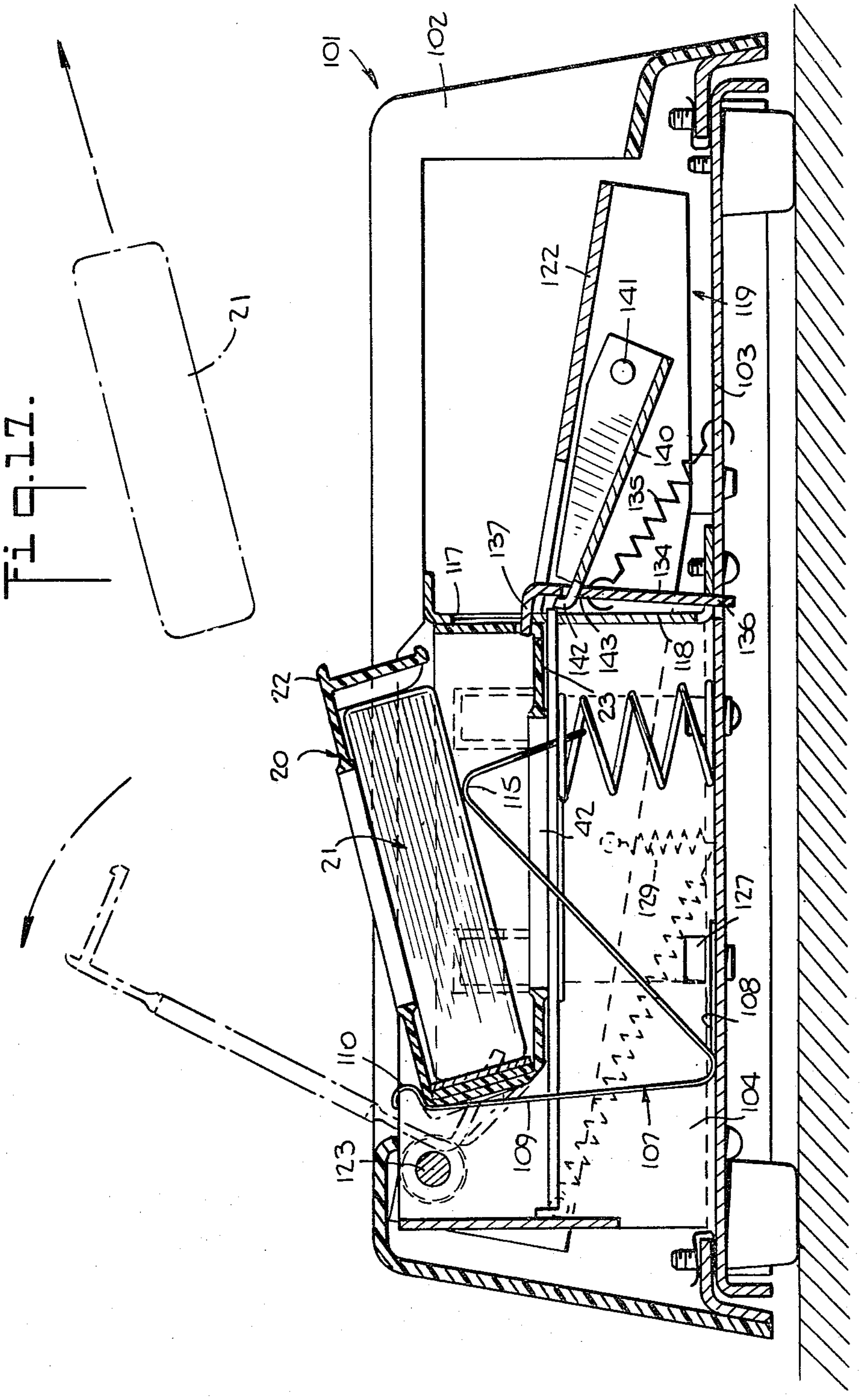

As best seen in FIG. 14, the article 20 is inserted with the wall 29 uppermost and in the direction indicated by the "arrow" 72 (see FIG. 1) such that its rear side wall, now the strap member 38, is engaged against the portion 109 of the member 107 under the lip 110 while the knee 115 formed between the portions 111 and 112 of the element 107 bears against the cassette container 21 through the opening 42 in the enclosure 20. As the enclosure 20 is urged downwardly and rearwardly relative to the releasing mechanism, the spring members 107 and 114 are loaded, i.e., member 109 is deflected rearwardly, portions 111 and 112 are deflected downwardly while helical spring 114 is placed under compression. Insertion of enclosure 20 continues until the front protuberances 70 and 71 penetrate the apertures 116 and 117, respectively, in the front plate 118 which forms a part of the frame assembly 104. The interengagement between the apertures 116 and 117, on the one hand, and ribbed protuberances 70 and 71, on the other hand, in cooperation with the lip 110, serves to grasp and secure the section 23 of the enclosure 20 in the position shown in FIGS. 12 and 15.

For releasing the latches on the enclosure 20, there is provided a U-shape lever 119 having side arms 120 and 121 joined by a cross member 122. The lever 119 is mounted by its arms 120 and 121 on the opposite ends of a hinge pin 123 which is, in turn, carried by the frame 104. Spacers 124 and 125 separate the arms 120 and 121, respectively, from the sides of the frame member 104. Tension springs 144 between base plate 103 and the respective ends of lever arms 120 and 121 bias the lever 119 in a counterclockwise direction as seen in FIG. 14. Rocker plates 126 and 127, biased by respective tension springs 128 and 129, are pivotally supported at their lower edges 130 and 131 in the base plate 103. The upper edges of the plates 126 and 127 are provided with latch engaging fingers 132 which pass through the apertures 133 in the frame assembly 104 for engaging the individual latches 43, 44 on one side, and 45 and 46 on the other side of the enclosure 20.

In similar manner, for engaging the forward latches 47 and 48 of the enclosure 20, there is provided a rocker plate 134 spring biased by tension spring 135 and pivotally mounted at its lower end 136 in the base plate 103. The upper end of the plate 134 is provided with the fingers 137 which pass through the apertures 116 and 117 to engage latches 47 and 48.

Figure 13:
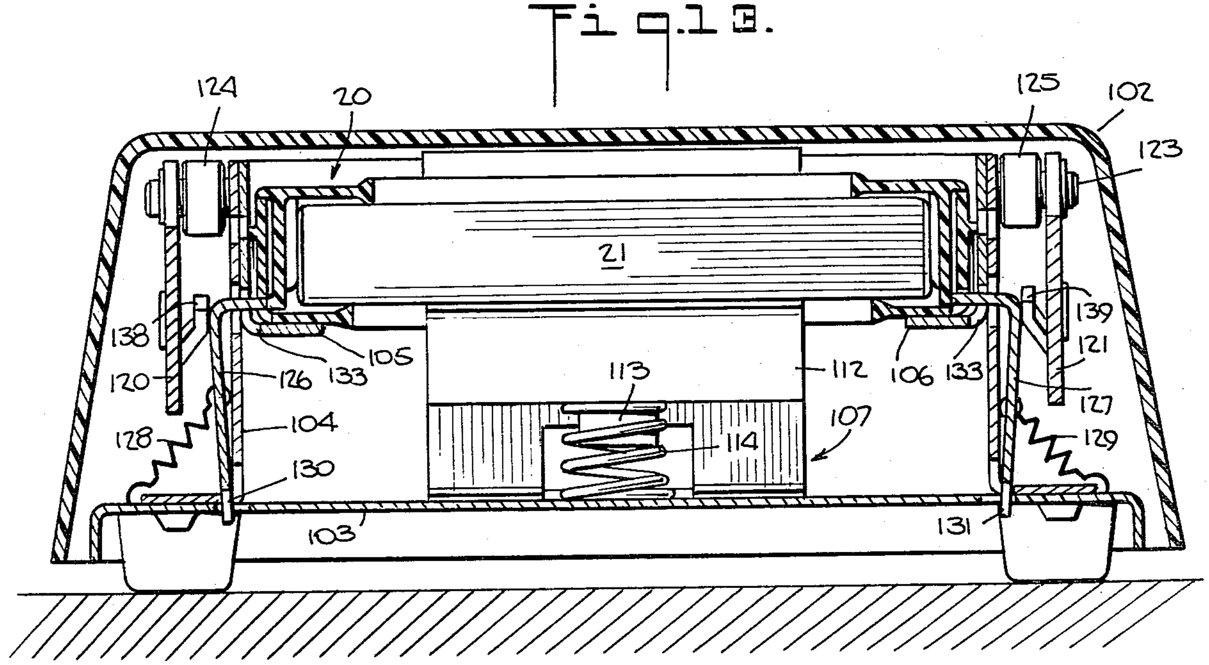
FIG. 13 is a view similar to FIG. 12 but showing the mechanism in its releasing condition.

Actuation of the rocker plates 126 and 127 is accomplished by respective cam fingers 138 and 139 struck from the respective arms 120 and 121 of the lever 119. Thus, as illustrated in FIG. 13, the finger 138 bears against and displaces the plate 126 as the lever 119 is depressed through pressure upon its cross member 122. Similarly, the finger 139 engages and displaces the plate 127.

A knee action plate 140 is pivotally secured to the lever 119 at 141 and pivotally interconnected at its opposite end with the plate 134 by fingers 142 passing through apertures 143. As best seen in FIG. 16, as the lever 119 is depressed, the knee action member 140 displaces the rocker plate 134 to the left so as to urge the fingers 137 into unlatching engagement with the latches 47 and 48.

It should now be understood that as soon as lever 119 has been depressed sufficiently to urge all of the rocker plates 126, 127 and 134 into unlatching position as seen in FIGS. 13, 16 and 17, the spring pressure developed by members 107 and 114 will elevate both the cassette container 21 and the section 22 of enclosure 20 to the position shown generally in FIG. 17. The section 22 can then be opened further manually, the cassette container 21 removed, and the entire enclosure 20 thereupon extracted by lifting vertically from the releasing mechanism 101.

Having described the presently preferred embodiments of the invention, it should be understood that various changes in detail of construction may be made by those skilled in the art without departing from the true spirit of the invention as defined in the appended claims.

What is claimed is:

1. Apparatus for preventing unauthorized removal of a small article from a protected area comprising in combination a device whose presence in said protected area is detectable by a surveillance unit, a wraparound enclosure having first and second interconnected sections for installation by wrapping about said article and for securing said device thereto, a plurality of independent latch means each including a latch and a mating strike for interlocking said sections in closed condition, said latch means being disposed on at least two different sides of said enclosure, and a releasing mechanism having means for simultaneously unlatching all of said latch means while grasping said second section and applying opening stress to said first section relative to said second section.

2. Apparatus according to claim 1, wherein at least said second section has an opening therein and means are provided for projecting through said opening to engage said article and apply said opening stress through said article to said first section to thereby dislodge said article from said second section upon opening of said enclosure.

3. Apparatus according to claim 1, wherein said first and second sections have respective primary walls and side walls normal to said primary walls such that said sections mate telescopingly with the side walls of said first section entering within the side walls of said second section to form a right rectangular parallelepiped enclosure, and said latches are disposed projecting from side walls of said first section and said strikes are disposed in side walls of said second section.

4. Apparatus according to claim 3, wherein said enclosure is formed from plastic material and said first and second sections are joined along a back edge by a strap member joined to each section by a living hinge, the side walls at the right and left sides of said first section near said back edge being formed with respective notches extending inwardly from the free edge of the side wall toward the associated primary wall, and T-shape lugs carried by the mating side walls of said second section for interengagement with a corresponding one of said notches for preventing separation of the respective overlapping right and left side side walls in a direction normal to the side walls.

5. Apparatus according to claim 4, wherein said first section has side walls along all four side edges of its primary wall, the side wall adjacent the back edge being located inward adjacent one of said living hinges such that upon closure of said sections said strap member overlies said last mentioned side wall with a close fit, and said second section has side walls along only three of its four side edges, it having no side wall along the back edge of its primary wall.

6. Apparatus according to claim 5, wherein the primary wall of said first section projects beyond its respective side walls along its right, left and front edges over a major portion of said edges for overlapping the adjacent edges of the corresponding side walls of said second section when the enclosure is closed to bar access to the interface region between overlapping side walls.

7. Apparatus according to claim 3, wherein at least one of said side walls of said first section is provided with a plurality of said latches mutually spaced along the length thereof, and means are provided for reinforcing said one side wall between said latches so as to resist communication to one latch of deflecting forces which have been applied to an adjacent latch in a direction substantially normal to the plane of said one side wall sufficient to deflect said one side wall in the vicinity of said adjacent latch.

8. Apparatus according to claim 4, wherein at least one of said side walls of said first section is provided with a plurality of said latches mutually spaced along the length thereof, and means are provided for reinforcing said one side wall between said latches so as to resist communication to one latch of deflecting forces which have been applied to an adjacent latch in a direction substantially normal to the plane of said one side wall sufficient to deflect said one side wall in the vicinity of said adjacent latch.

9. Apparatus according to claim 3, wherein said enclosure is formed from plastic material and said first and second sections are joined along a back edge by a strap member joined to each section by a living hinge, and means are provided for interrelating the side walls at the right and left sides of said first section near said back edge with the mating overlapping side walls of said second section to prevent separation of said overlapping right and left side side walls in a direction normal to the side walls.

10. Apparatus according to claim 9, wherein the side walls of said first section at the right, left and front sides thereof, are each provided with a pair of said latches spaced apart along the length of the corresponding side wall, and the corresponding side walls of said second section are each provided with a corresponding pair of said strikes.

11. Apparatus for preventing unauthorized removal of a small article from a protected area comprising in combination a device whose presence in said protected area is detectable by a surveillance unit, a wraparound enclosure having first and second interconnected sections for installation by wrapping about said article and for securing said device thereto, and a plurality of independent latch means each including a latch and a mating strike for interlocking said sections, said latch means being disposed on at least two different sides of said enclosure and constructed and arranged such that the enclosure may be opened only upon simultaneously unlatching all of said latch means while grasping said second section and applying opening stress to said first section relative to said second section.

12. Apparatus according to claim 11, wherein said enclosure is formed from plastic material, said first and second sections have respective primary walls and side walls normal to said primary walls such that said sections mate telescopingly with the side walls of said first section entering within the side walls of said second section to form a right rectangular parallelepiped enclosure, said first and second sections are joined along a back edge by a strap member joined to each section by a living hinge, said latches are disposed projecting from side walls of said first section and said strikes are disposed in side walls of said second section, and means are provided for interrelating the side walls at the right and left side of said first section near said back edge with the mating overlapping side walls of said second section to prevent separation of said overlapping right and left side side walls in a direction normal to the side walls.

13. Apparatus according to claim 12, wherein the side walls of said first section at the right, left and front sides thereof, are each provided with a pair of said latches spaced apart along the length of the corresponding side wall, and the corresponding side walls of said second section are each provided with a corresponding pair of said strikes.

14. Apparatus according to claim 12, wherein said means for interrelating the side walls comprise respective notches in the side walls at the right and left sides of said first section extending inwardly from the free edge of the side wall towards the associated primary wall, and T-shape lugs carried by the mating side walls of said second section for interengagement with a corresponding one of said notches.

15. Apparatus according to claim 12, wherein said first section has side walls along all four side edges of its primary wall, the side wall adjacent the back edge being located inward adjacent one of said living hinges such that upon closure of said section said strap member overlies said last memtioned side wall with a close fit, and said second section has side walls along only three of its four side edges, it having no side wall along the back edge of its primary wall.

16. A releasing mechanism for unlatching and opening a wraparound enclosure to release therefrom a small article where said enclosure has first and second interconnected sections for installation about said article and for securing thereto a device whose presence in a protected area is detectable by a surveillance unit, and a plurality of latch means for interlocking said sections, said latch means being disposed on at least two different sides of said enclosure, said releasing mechanism comprising means for supporting said enclosure in closed condition while grasping said second section, means selectively actuable for simultaneously engaging and releasing all of said latch means, and means for applying opening stress to said first section relative to said second section at least during actuation of said releasing means.

17. A releasing mechanism according to claim 16, wherein said enclosure has first and second interconnected sections with respective primary walls and side walls normal to said primary walls such that said sections mate telescopingly with the side walls of said first section entering within the side walls of said second section to form a right rectangular parallelepiped enclosure, and said latch means each comprise a latch projecting from a side wall of said first section and a mating strike in a side wall of said second section, said releas- mechanism comprising means for grasping said second section while applying said opening stress to said first section, and said releasing means comprise articulable fingers mounted for simultaneous articulation into engagement with a respective one of said latches for disengaging the same from their associated strikes.

18. A releasing mechanism according to claim 16, wherein at least said second section has an opening therein, and wherein at least said second section has an opening therein, and said means for applying opening stress comprises a spring biased member for projecting through said opening in said second section to engage said article when said enclosure in closed condition is urged thereagainst to load said spring biased member, and said means for supporting said enclosure is disposed to grasp said second section in a position maintaining said spring biased member under load.

19. A releasing mechanism according to claim 16, wherein said second section has at least one protuberance extending from the outer surface of at least one wall thereof, and said means for grasping said second section comprises means defining an aperture for receiving said protuberance therein, and means for resiliently engaging a wall of said enclosure opposite said one wall for urging said protuberance into said aperture.

* * * * *